(No Model.)
W. M. GILMORE.
VALVE FOR AIR BRAKES.
No. 479,978. Patented Aug. 2, 1892.
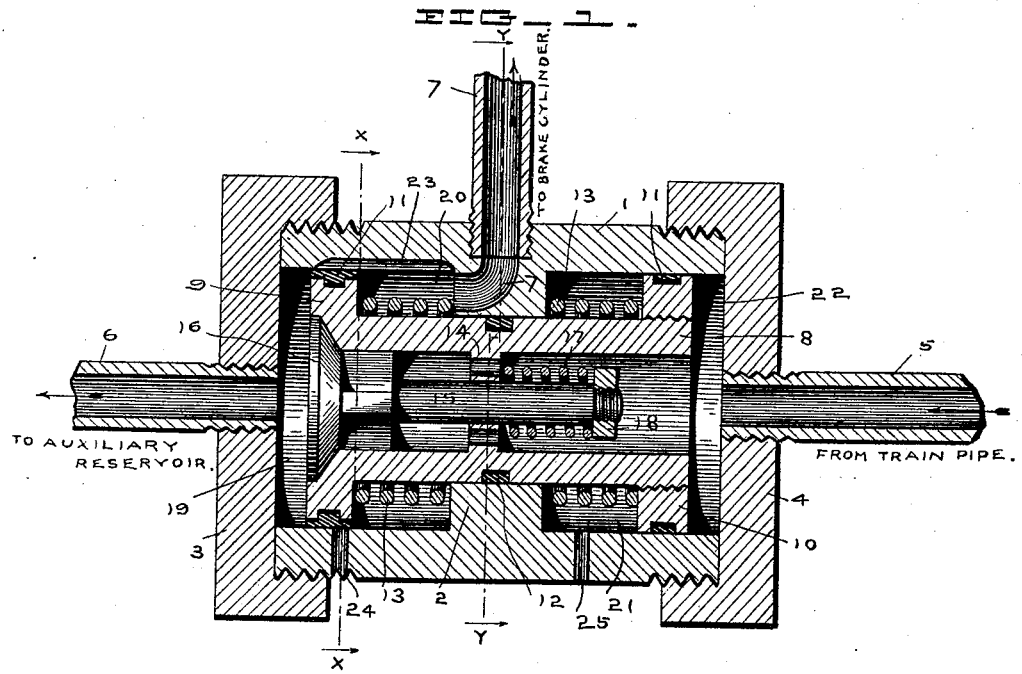
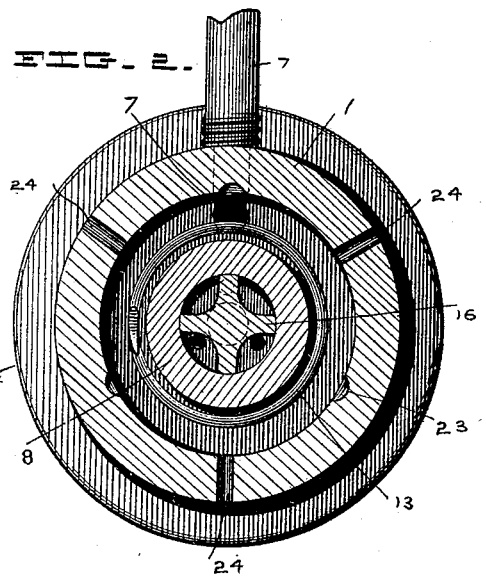
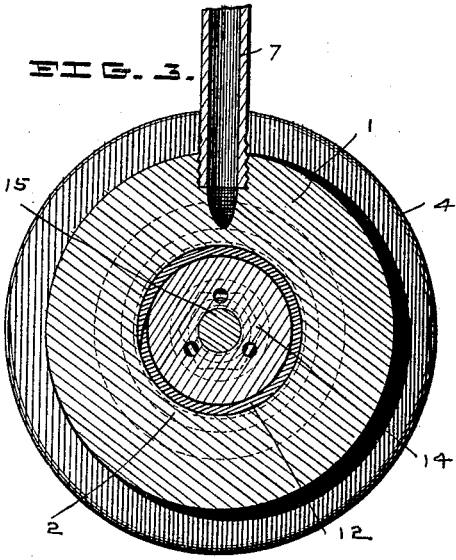
Witnesses
H. D. Nealy.
E. P. Griffith.
Inventor
William M. Gilmore,
By his Attorney
C. P. Jacobs.

UNITED STATES PATENT OFFICE.

WILLIAM M. GILMORE, OF BOGGSTOWN, INDIANA.

VALVE FOR AIR-BRAKES.

SPECIFICATION forming part of Letters Patent No. 479,978, dated August 2, 1892.

Application filed October 30, 1891. Serial No. 410,368. (No model.)

*To all whom it may concern:*

Be it known that I, WILLIAM M. GILMORE, of Boggstown, county of Shelby, and State of Indiana, have invented certain new and useful Improvements in Valves for Air-Brakes; and I do hereby declare that the following is a full, clear, and exact description thereof, reference being had to the accompanying drawings, in which like figures refer to like parts.

My invention relates to improvements in the construction of valves for air-brakes, whose operation is effected by the increase or decrease of air in the train-pipe, and is controlled in the ordinary manner through connection with the engine, and is intended to take the place of the more cumbersome and complicated valve now in use known as the "triple" valve.

In the drawings, Figure 1 is a central longitudinal section of the valve. Fig. 2 is a cross-section on the line $x\,x$, Fig. 1. Fig. 3 is a central vertical section on the line $y\,y$, Fig. 1.

In detail, 1 is the valve casing or cylinder, which is provided with an inner central rib 2. 3 and 4 are end caps screwed on the casing in the ordinary manner.

5 is the inlet from the train-pipe, which is connected to the main reservoir or tank holding the compressed air.

6 is the inlet to the auxiliary tank, and 7 is the outlet to the brake-cylinder.

8 is the main valve in the form of a hollow cylinder, provided at each end with out-turned flanges 9 and 10, one of which is removable. These flanges have seats for packing-rings 11, which bear against the inner face of the casing 1, and the valve is also provided with a central packing-ring 12, which bears against the rib 2 of the casing.

13 are springs coiled around the valve 8, between the rib 2 and the flanges 9 and 10, for maintaining the normal equilibrium of the valve.

14 is a partition in the valve 8 and is centrally bored to form a bearing for the valve-stem 15, which works therein.

16 is a valve formed on the end of the stem, having its seat in the flange 9 of the main valve 8. The partition 14 has also small holes, as shown in Fig. 3, to allow the compressed air to pass through into the auxiliary reservoir.

17 is a spring coiled around the valve-stem 15 and held against the partition 14 by a nut 18, screwed on the end of the stem.

As will be seen by reference to Fig. 1, the interior of the valve-casing 1 is divided by the rib 2 and flanges 9 and 10 into four chambers 19, 20, 21, and 22, which vary in size as the valve moves.

23 are passages cut in the casing 1 between the chambers 19 and 20, and 24 are ports leading from the chamber 20 to the open air.

25 is an air-vent leading from the chamber 21.

Having described the various parts of my device, I will now describe the operation of the same.

The auxiliary reservoir is filled with air from the train-pipe, which passes into the chamber 22, thence through the holes in the partition 14 of the valve 8 and opens the valve 16, passing on into the auxiliary reservoir through the pipe 6 until the air-pressure is the same on both sides of the valve 16, when the force of the spring 17 closes the valve 16, preventing the air in the auxiliary reservoir from passing back into the train-pipe. When the air-pressure in the auxiliary reservoir and chamber 19 is the same as in the train-pipe and chamber 22, the brakes will stand in an inoperative position, there being then no pressure in the chamber 20, and to set the brakes the air-pressure in the train-pipe must be reduced. This creates a preponderance of pressure in the chamber 19 over that in the chamber 22, which forces the main valve 8 to the right, opening the passages 23, allowing the compressed air in the auxiliary reservoir to escape into the chamber 20 and thence into the brake-cylinder, where it operates on a piston and applies the brakes in the usual manner. The air will continue to pass into the brake-cylinder until the pressure in the chamber 20 on the inner face of the flange 9 plus the pressure in the chamber 22 on the valve 8 becomes equal to the pressure in the chamber 19, when the valve 8 will be returned by the force of the springs 13 to its normal position of equilibrium, closing the passages 23 and cutting off the air-pressure in the brake-cylinder. If a greater pressure is desired in the brake-cylinder, a further reduction of pressure in the train-pipe will cause the valve 8 to move to the right, as before, and it will again come to its normal position when sufficient air has escaped into the brake-cylinder to make the pressure in the chamber 20 on the flange 9 plus the pressure in the chamber 22 on the valve 8 equal to the pressure in the chamber 19 on the valve 8. This operation can be continued until the pressure per square inch in the brake-cylinder becomes equal to that in the auxiliary reservoir, when a further reduction of pressure in the train-pipe will not affect the pressure in the brake-cylinder. Whenever it is desired to reduce the pressure on the brakes, the pressure in the train-pipe must be raised, when, the combined pressure in the chambers 20 and 22 on the valve 8 being greater than that in the chamber 19, the valve 8 is forced to the left, opening the exhaust-ports 24 and allowing the air to escape from the brake-cylinder until the pressure in the chamber 20 has been reduced sufficiently to allow the valve 8 to return to its normal position, as before stated. This operation can be repeated until the pressure in the chamber 22 becomes equal to that in the chamber 19, when the brake-cylinder will be exhausted and the auxiliary reservoir can be refilled. It will thus be seen that in order to keep the valve 8 in its normal position the pressure in the chamber 20 must equal the difference in pressure of the chambers 19 and 22. Now as the area of the chamber 20 is less than that of the chamber 22 the pressure per square inch therein must be greater than the difference in pressure per square inch of the chambers 19 and 22, or the relation that the pressure per square inch in the brake-cylinder bears to the difference in pressure per square inch of the chambers 19 and 22 will be the inverse of the piston areas in the chambers 20 and 22. The entire pressure of air upon the brakes is therefore readily and easily controlled by the engineer where my valve is used. Thus in descending a long grade, where it is desirable to have less than a full pressure upon the brakes, the engineer can change the pressure in the train-pipe so as to carry any desired pressure upon the brakes throughout the descent. For instance, if the pressure in the auxiliary reservoir is eighty pounds the engineer can exhaust the air from the train-pipe until it stands at seventy pounds. This will give a pressure of about twenty-five pounds per square inch in the brake-cylinder, and this pressure will then remain until the engineer changes the pressure in the train-pipe.

Heretofore, so far as I am aware, in ordinary automatic brake mechanism when pressure is applied it acts suddenly and all at once, and in attempting to regulate the pressure the operator often opens and closes the triple valve commonly used alternately or "jiggles" the valve back and forth, and the entire air-pressure is frequently lost, and the brake mechanism then becomes inoperative.

What I claim as my invention, and desire to secure by Letters Patent, is the following:

1. A regulating-valve for air-brake mechanism, comprising a cylinder, an inlet from the train-pipe, connected at one end thereof, a similar pipe connected at the opposite end, leading to the auxiliary air-reservoir, a pipe leading to the brake-cylinder, a central rib in such main cylinder, a piston-valve moving therein having springs between the end flanges of the valve and on each side of the rib for holding the valve normally in an operative position, such main valve provided with a central bore, an auxiliary valve working in such bore and having openings to admit the passage of air through to the auxiliary reservoir, such cylinder also provided with ports for permitting the passage of air to the brake-cylinder, exhaust-ports for permitting the escape of the compressed air from such cylinder on one side of the main valve, and an air-vent opening into the cylinder on the train-pipe side thereof, substantially as shown and described.

2. A regulating-valve for air-brake mechanism, comprising a cylinder, its ends closed by caps, an inlet from the train-pipe passing through one cap into the cylinder, a similar pipe from an auxiliary reservoir passing through the opposite cap and connecting with the air-space in the cylinder, such cylinder also provided with an outlet-pipe leading to the brake-cylinder, exhaust-ports connected with the air-chamber at one end of the cylinder, an air-vent connecting with the chamber at the opposite end so as to facilitate the movement of the valve, a piston-valve provided with the usual packing moving in such cylinder and having springs mounted upon its valve-stem bearing against the flanges of the valve on one side and against a rib centrally formed in such cylinder on the other, whereby the valve is normally held in such position that the ports leading to the brake-cylinder and to the exhaust are kept closed, an auxiliary valve working through the main valve having holes bored centrally through it to admit the passage of air, such valve located in line with the openings to the train-pipe and auxiliary reservoir and having its seat in the flange of the main valve adjacent to the opening to the auxiliary reservoir, and a spring mounted on the valve-stem of such auxiliary valve for normally holding it to its seat, such auxiliary valve adapted to be opened by a preponderance of pressure in the train-pipe over that of the auxiliary reservoir and automatically closed when there is no such preponderance, both valves being shorter than the cylinder, whereby the excess of pressure on either side the main valve is adapted to operate the same, opening and closing the ports leading to the brake-cylinder, all combined substantially as shown and described.

3. A regulating-valve for air-brake mechanism, comprising a cylinder, its ends closed by suitable caps, an inlet from the train-pipe connected through one cap to an outlet-pipe to an auxiliary reservoir connected through the other cap, a piston-valve working in such cylinder normally held in position by the pressure of springs coiled upon its stem so as to close the exhaust and inlet ports to the brake-cylinder, each valve centrally bored, a smaller valve working in such bore, having holes to admit the passage of air through it to the auxiliary reservoir and normally held closed by the pressure of a spring coiled upon its stem, exhaust-ports leading from the chamber at one end of such cylinder, and an air-vent leading from the chamber at the opposite end thereof, in combination with suitable main and auxiliary air-reservoirs and a brake-cylinder, substantially as shown and described.

In witness whereof I have hereunto set my hand this 24th day of September, 1891.

WILLIAM M. GILMORE.

Witnesses:
C. P. JACOBS,
E. B. GRIFFITH.